United States Patent [19]

Butler

[11] Patent Number: 4,647,715
[45] Date of Patent: Mar. 3, 1987

[54] AERIAL COMMUNICATION CABLE CLOSURE

[76] Inventor: David O. Butler, 1306 Vermont Ave., Tarpon Springs, Fla. 33589

[21] Appl. No.: 822,116

[22] Filed: Jan. 24, 1986

[51] Int. Cl.⁴ ..................... H02G 15/113; H02G 7/08
[52] U.S. Cl. ......................................... 174/41; 24/587; 24/704; 138/166; 138/168; 174/59; 174/92
[58] Field of Search ............................... 174/41, 59, 92

[56] References Cited

U.S. PATENT DOCUMENTS

| | | | |
|---|---|---|---|
| 2,891,101 | 6/1959 | Koliss | 174/41 X |
| 3,836,696 | 9/1974 | Gressitt et al. | 174/41 |
| 3,971,894 | 7/1976 | Faust et al. | 174/41 |
| 4,084,067 | 4/1978 | Gillemot | 174/41 X |
| 4,486,620 | 12/1984 | Ball et al. | 174/41 |
| 4,535,197 | 8/1985 | Butler | 174/41 |
| 4,536,611 | 8/1985 | Butler | 174/41 |
| 4,605,815 | 8/1986 | Wilson | 174/41 |

Primary Examiner—Laramie E. Askin

[57] ABSTRACT

An aerial communication cable closure is comprised of a one-piece, hollow, box-like housing with conical ends having an integral hinge formed at the inside upper surface. The closure includes a pair of interconnecting edges separated by an access slot. The edges are fastened together in a mating engagement after passing a cable through the slot. The closure also includes electrically conductive hanger brackets which are attached to the housing, each having interfitting segments allowing the hanger brackets to hinge with the integral hinge formed in the inside upper surface of the housing. When cable termination is desired for the terminating of cable conductors with service wires, a rectangular compartment with an integrally hinged lid is attached to one side of the box-like housing in which a terminal block is mounted.

5 Claims, 12 Drawing Figures

AERIAL COMMUNICATION CABLE CLOSURE

FIELD OF THE INVENTION

This invention relates to apparatus for enclosing cable splices and cable repair openings, more particularly it relates to improvements in cable enclosures.

BACKGROUND OF THE INVENTION

Aerial cable closures for use in enclosing cable splices and cable repair openings have long been made with the need for specialized equipment and tools which increase the cost of each application. Still others are constructed in such a way that they come in a multitude of assorted parts, which results in time consuming installations and often a cannibalizing of other closures to replace lost parts. Such prior art enclosures often fail to maintain an adequate barrier against moisture, the entry of insects, and sunlight, whose ultra-violet rays can rapidly break down the insulation of the color coded plastic insulated conductors of the cables. Such prior art enclosures often have a serious problem concerning their inability to prevent unauthorized entry to the cable splices. It is this unauthorized entry where often the cable splices can be altered or damaged. Examples of such prior art enclosures are found in U.S. Pat. Nos. 4,486,620; 3,836,696; 4,084,067; 2,891,101. Other attempts have been made to overcome the foregoing disadvantages. One such attempt is disclosed in U.S. Pat. No. 3,971,894 which shows an enclosure consisting of both a separate hanger frame and a separate outer cover. However, these attempts have not completely overcome the disadvantages mentioned, in particular the problem with unauthorized entry.

OBJECTS OF THE INVENTION

Accordingly, it is an object of this invention to provide an improved cable closure for the enclosing of cable splices and cable repair openings.

Another object is to simplify cable closures to eliminate loose parts required to be assembled on site resulting in one which is easier to seal than has been available in the prior art.

Another object is to provide a durable closure, one which is impervious to moisture, insects and damaging sunlight.

Yet another object is to provide a tamper resistant enclosure which once sealed provides an encapsulation which is secure against unauthorized entry.

SUMMARY OF THE INVENTION

The foregoing and additional objects of this invention are attained by an aerial communication cable closure which consists of a one-piece, hollow, box-like housing with conical ends having an integral hinge formed longitudinally at the inside upper surface. The closure includes a pair of interconnecting edges separated by an access slot. The edges are fastened after passing the cable splice through the access slot. The closure also includes two electrically conductive hanger brackets for the fastening to an aerial support strand, each having interfitting segments allowing the hanger brackets to hinge with the opening and closing of the closure housing. When cable termination is desired for the terminating of cable conductors with service wires, a rectangular compartment with an integrally hinged lid is attached to one side of the box-like housing in which a terminal block is mounted.

The resultant aerial cable closure invention provides an improved enclosure for the encapsulation of cable splice and cable repair openings which is easier to seal and has less loose parts required to assemble on site than has been available in the prior art. The invention is more impervious to moisture, insects and damaging sunlight than has been available in the prior art. In addition, the invention is more secure against unauthorized entry than has been available in the prior art.

The foregoing objects, advantages, features and results of the present invention, together with various other objects, advantages, features and results thereof which will be evident to those skilled in the cable splice enclosure art in the light of this enclosure, may be achieved with the exemplary embodiment of the invention illustrated in the accompanying drawings and described in detail hereinafter.

DETAILED DESCRIPTION OF THE PREFERRED EMBODIMENTS

Figure 1:
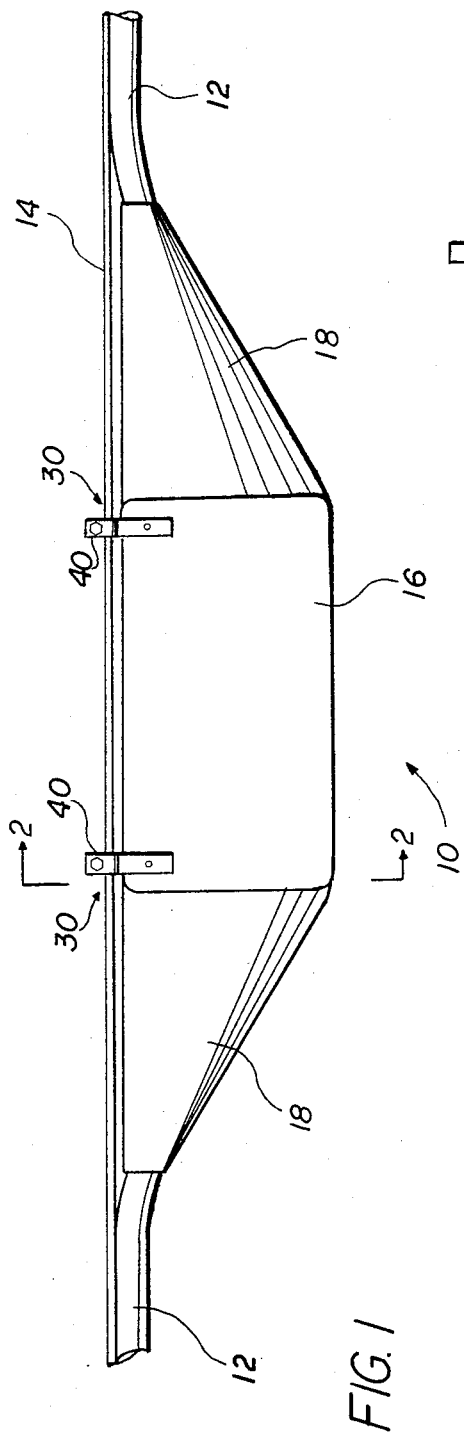
FIG. 1 is a side view of the closure.
Figure 7:
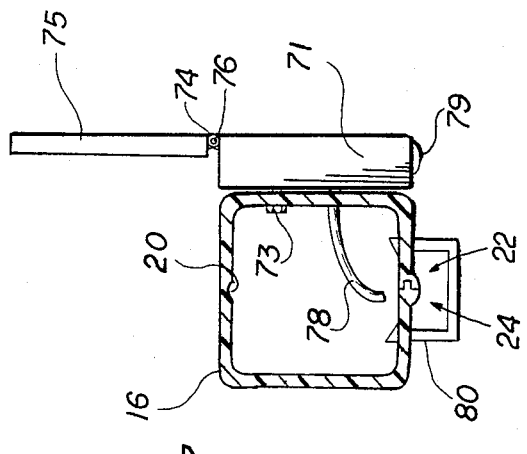
FIG. 7 is a cross sectional view along section line 7—7 of FIG. 5.
Figure 6:
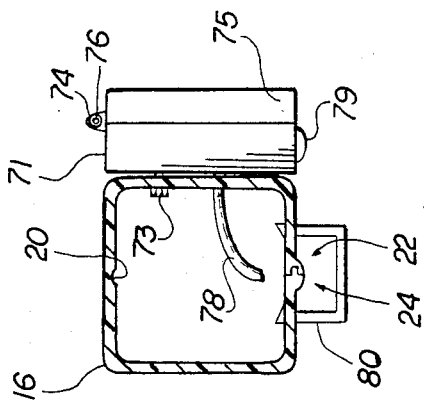
FIG. 6 is a cross sectional view along section line 6—6 of FIG. 4.
Figure 4:
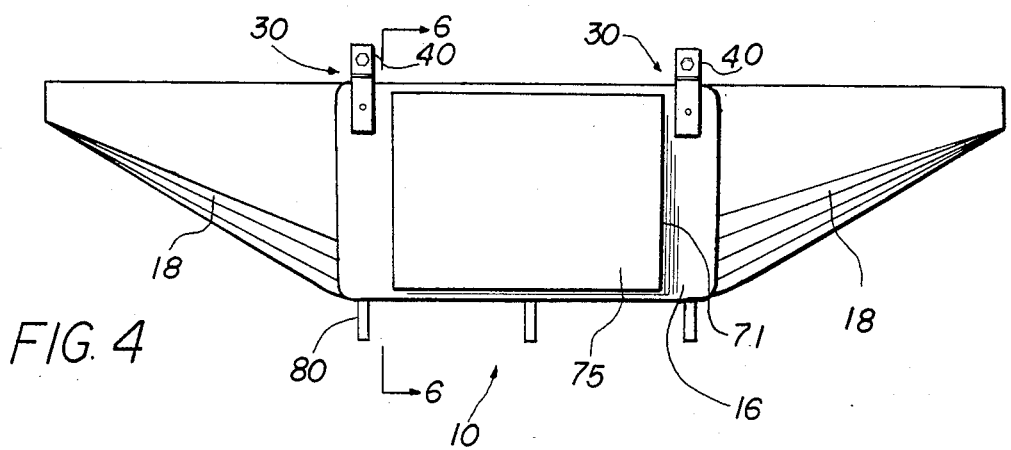
FIG. 4 is a side view of the closure with a terminal compartment lid in the closed position.
Figure 5:
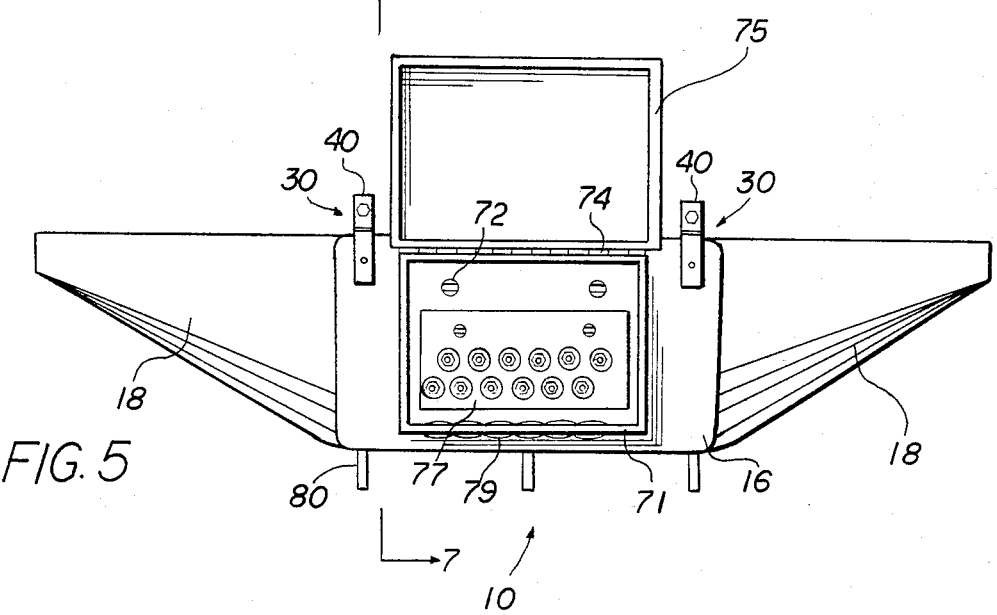
FIG. 5 is a side view of the closure with a terminal compartment lid in the open position.
Figure 11:
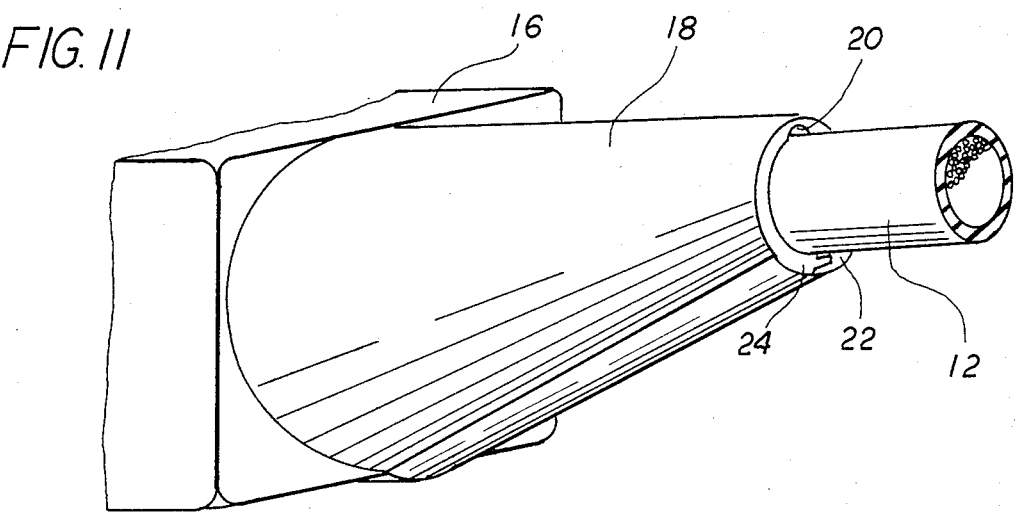
FIG. 11 is a fragmentary, perspective view of the closure.

Referring first to FIG. 1, the aerial communication cable closure 10 for enclosing a communication cable 12 is shown suspended from a support strand 14. The closure 10 includes a one-piece, hollow, box-like housing 16 having integral conical ends 18 shown to better advantage in FIG. 11 as well as FIGS. 4 and 5. The closure is also shown to have a pair of longitudinal interconnecting edges 22 and 24 separated by a longitudinal access slot. The edges 22 and 24 can be fastened in mating engagement after passing the cable 12 through the slot. The edges 22 and 24 extend along the entire length of the bottom of the housing 16 and conical ends 18.

The closure 10 further includes an integrally formed hinge 20 to the inside upper surface of the housing 16 and conical ends 18. Such an integral hinge 20 would permit the increase in wall thickness of the housing 16 and conical ends 18 and would be approximately 0.250 inch thick. This contributes to the longevity and durability of the closure 10 and one-piece nature thereof. For example, both side wall halves 26 and 28 can comprise a single-piece molding of relatively rigid plastic such as polypropylene or acrylonitrile-butadiene-styrene and hinge 20 can comprise a reduced thickness section of such molding which provides sufficient flexibility for a hinging action.

Figure 2:
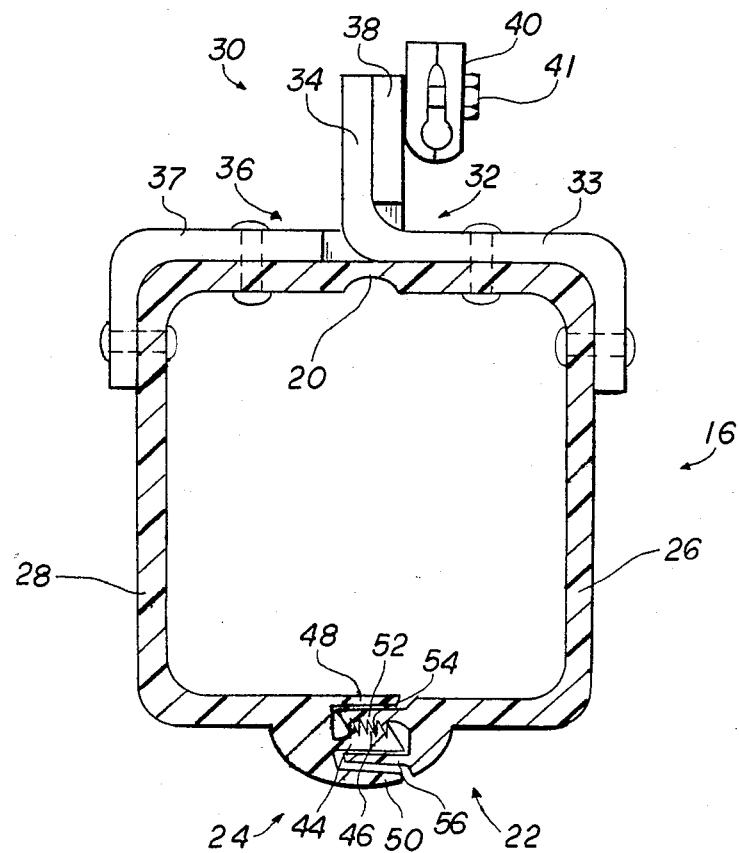
FIG. 2 is a cross sectional view along the section line 2—2 of FIG. 1, showing a first embodiment of the closure as a tamper-resistant snap lock, in its closed state.
Figure 8:
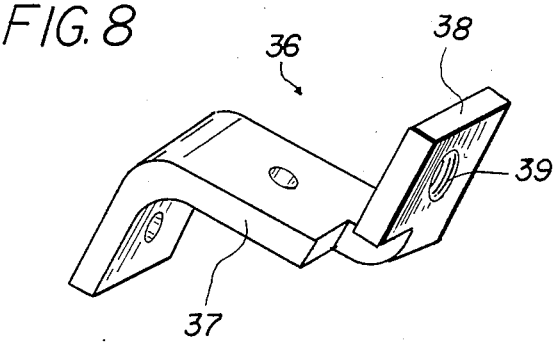
FIG. 8 is a perspective view of one interfitting portion of a hanger bracket.
Figure 9:
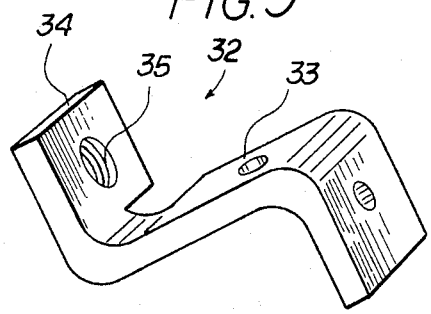
FIG. 9 is a perspective view of a second interfitting portion of a hanger bracket.
Figure 10:
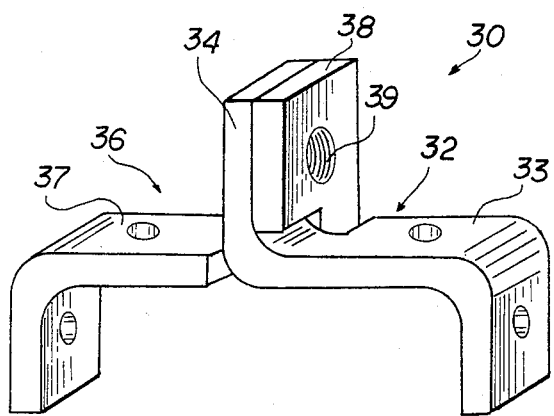
FIG. 10 is a perspective view of a hanger bracket having interfitting portions.

The closure 10 also includes electrically conductive hanger brackets 30 each having interfitting segments 32 and 36. Segment 32 has a lower portion 33 to which housing 16 is fastened and a vertical portion 34 projecting upward having a threaded aperture 35 for the receiving of bolt 41. Segment 36 has a lower portion 37 to which housing 16 is fastened and a vertical portion 38 projecting upward having a threaded aperture 39 through which bolt 41 for strand clamp 40 is threaded through to engage the threaded aperture 35 of vertical portion 34 for the fastening of strand clamp 40 to aerial strand 14. The interfitting features of the hanger bracket segments 32 and 36 are shown to a better advantage in FIGS. 8 to 10 as well as FIGS. 2 and 3.

Figure 3:
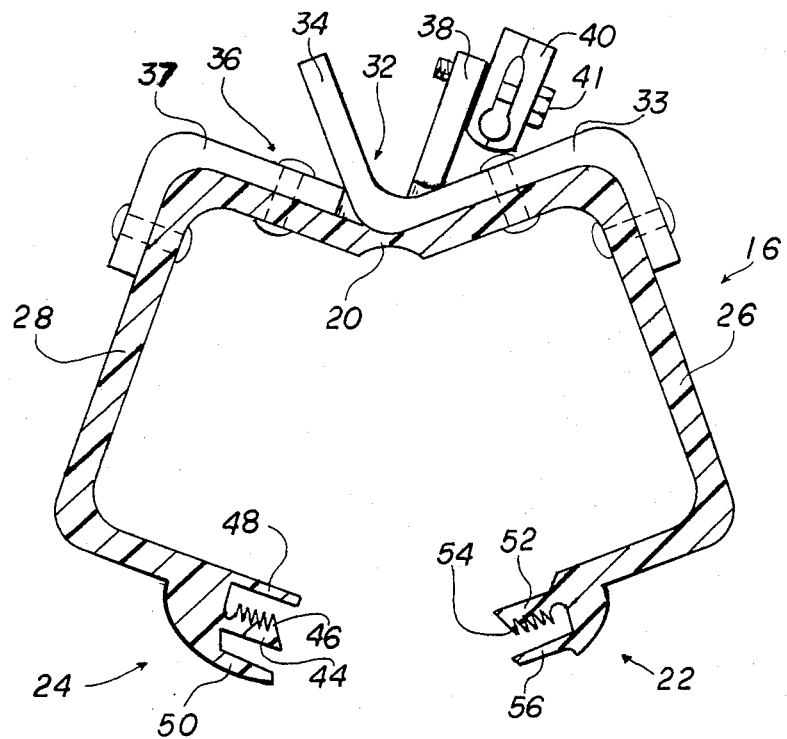
FIG. 3 is a view similar to that in FIG. 2, showing the first embodiment of the closure in its open state.

FIG. 3 illustrates the first embodiment of the invention, which provides an impervious, tamper-resistant seal for the housing 16. The housing 16 includes the tamper-resistant snap lock in which the first longitudinal edge 24 of the pair includes a first sawtooth portion 44 projecting from the wall 28 and having an upwardly projecting serrated surface 46, an upper guard 48 projecting from the wall 28 and extending above the serrated surface 46 of the sawtooth portion 44, and a first lower guard portion 50 projecting from the wall 28 and extending below the sawtooth portion 44.

The second longitudinal edge 22 of the pair includes a second sawtooth portion 52 projecting from wall 26 and having a downwardly projecting serrated surface 54 and a second lower guard portion 56 projecting from the wall 26 and extending below the second sawtooth portion 52.

The second sawtooth portion 52 of the second edge 22 is disposed for mating engagement between an upper guard 48 and the first sawtooth portion 44 of the first edge 24, and the second lower guard portion 56 of the second edge 22 is disposed for mating engagement between the first sawtooth portion 44 and the first lower guard portion 50 of the first edge 24.

In this manner, the first and second sawtooth portions 44 and 52 are protected by both the first and second lower guard portions 50 and 56, respectively.

Figure 12:
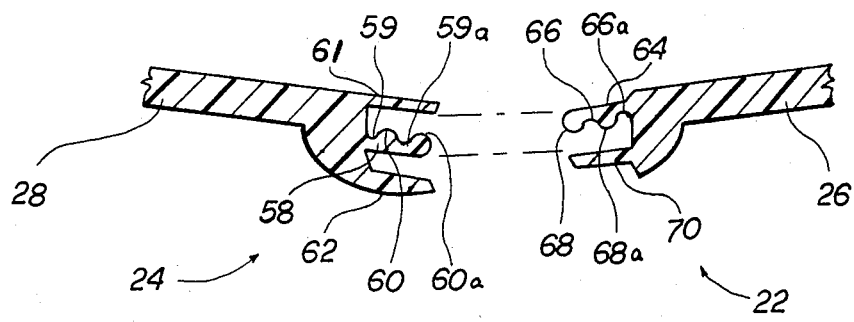
FIG. 12 is a view similar to that of FIG. 3, showing a second embodiment of the closure as a re-enterable snap lock.

FIG. 12 shows the re-enterable feature of the second embodiment of this invention. This embodiment provides for the relatively easy re-entry into the closure 10. The first longitudinal edge 24 of the pair includes a first mating segment 58 projecting from the wall 28 on whose upper surface are two continuous grooves 59 and 59a, respectively, and is further provided with two continuous ridges 60 and 60a, respectively. Edge 24 includes an upper guard portion 61 projecting from the wall 28 and extending above the mating segment 58, and a first lower guard portion 62 projecting from the wall 28 and extending below the mating segment 58.

The second longitudinal edge 22 of the pair includes a second mating segment 64 projecting from the wall 26, on whose lower surface are two continuous grooves 66 and 66a, respectively, and is further provided with two continuous ridges 68 and 68a, respectively. Edge 24 includes a second lower guard portion 70 projecting from the wall 26 and extending below the second mating segment 64.

The second mating segment 64 of the second edge 22 is disposed for mating engagement between the upper guard 61 and the first mating segment 58 of the first edge 24, and the second guard portion 70 of the second edge 22 is disposed for mating engagement between the first mating segment 58 and the first lower guard portion 62 of the first edge 24.

When cable termination is desired for the terminating of cable conductors with service wires, the closure would include a terminal compartment 71 which is attached to one side of housing 16 by bolts 72 which extend therethrough to engage with locking nuts 73, as shown in FIGS. 4 through 7. The terminal compartment 71 is a rectangular, box-like compartment having a hinge 74 integrally formed horizontally on a top side of the terminal compartment 71. A rectangular lid 75 is pivotally mounted on the hinge 74 and is attached by a stainless steel pin 76. The terminal compartment 71, integral hinge 74 and terminal lid 75 are composed of a moldable, durable plastic such as polypropylene or acrylonitrile-butadiene-styrene. A terminal block 77 is mounted within the compartment 71, having a stub 78 which protrudes through sealed apertures in housing 16 and terminal compartment 71 for the splicing to cable conductors. The bottom of the terminal compartment 71 includes grommeted openings 79 through which service wires can enter for termination with terminal block 77. Service wire hangers 80 are attached to the bottom of housing 16 to provide support for service wires.

Although specific embodiments of the invention have been disclosed for illustrative purposes, it will be understood that various changes, modifications and substitutions may be incorporated in such embodiments without departing from the invention as hereinafter claimed.

What is claimed is:

1. An aerial communication cable closure comprising:
   a one-piece, hollow, box-like housing with conical ends having an integral hinge formed longitudinally at the inside upper surface;
   a pair of longitudinal interconnecting edges separated by a longitudinal access slot, said edges being fastenable together in mating engagement after passing a cable through said slot;
   an electrically conductive hanger means having first and second interfitting segments, said first interfitting segment having a lower portion fastened to said housing and a vertical portion projecting upward, said second interfitting segment having a lower portion fastened to said housing and a vertical portion projecting upward, whereby said first and second vertical portions can be fastened to a support strand of an aerial cable by support clamp means.

2. The apparatus of claim 1, wherein said closure further comprises:
   a first longitudinal edge of said pair including a first sawtooth portion projecting from a first wall of said housing and having an upwardly projecting serrated surface, an upper guard portion projecting from said wall and extending above said serrated surface of said sawtooth portion, and a first lower guard portion projecting from said wall and extending below said sawtooth portion;
   a second longitudinal edge of said pair including a second sawtooth portion projecting from a second wall of said housing and having a downwardly projecting serrated surface, and a second lower guard portion projecting from said second wall and extending below said second sawtooth portion;

said second sawtooth portion of said second edge being disposed for mating engagement between said upper guard portion and said first sawtooth portion of said first edge, and said second lower guard portion of said second edge being disposed for mating engagement between said first sawtooth portion and said first lower guard portion of said first edge;

whereby said first and second sawtooth portions are protected by both said first and said second lower guard portions.

3. The apparatus of claim 1, wherein said closure further comprises:
- a first longitudinal edge of said pair including a first mating segment projecting from a first wall of said housing, the upper surface of said mating segment comprising two continuous grooves and ridges, an upper guard portion projecting from said wall and extending above said mating segment, and a first lower guard portion projecting from said wall and extending below said mating segment;
- a second longitudinal edge of said pair including a second mating segment projecting from a second wall of said housing, the lower surface of said second mating segment comprising two continuous grooves and ridges, and a second lower guard portion projecting from said second wall and extending below said second mating segment;
- said second mating segment of said second edge being disposed for mating engagement between said upper guard portion and said first mating segment of said first edge, and said second lower guard portion of said second edge being disposed for mating engagement between said first mating segment and said first lower guard portion of said first edge.

4. An aerial communication cable closure comprising:
- a one-piece, hollow, box-like housing with conical ends having an integral hinge formed longitudinally at the inside upper surface;
- a pair of longitudinal interconnecting edges separated by a longitudinal access slot, said edges being fastenable together in mating engagement after passing a cable through said slot;
- an electrically conductive hanger means having first and second interfitting segments, said first interfitting segment having a lower portion fastened to said housing and a vertical portion projecting upward, said second interfitting segment having a lower portion fastened to said housing and a vertical portion projecting upward, whereby said first and second vertical portions can be fastened to a support strand of an aerial cable by support clamp means;
- a terminal compartment attached to one side of said housing and being comprised of a rectangular, box-like compartment having a terminal block mounted therewithin;
- a hinge integrally formed horizontally on the top side of said compartment;
- a rectangular lid pivotally mounted on said hinge, for providing access to said terminal block; and
- a sealed aperture in said housing and said terminal compartment through which a terminating stub of said terminal block protrudes.

5. An aerial communication cable closure comprising:
- a one-piece, hollow, box-like housing with conical ends having an integral hinge formed longitudinally at the inside upper surface;
- a pair of longitudinal interconnecting edges separated by a longitudinal access slot, said edges being fastenable together in mating engagement after passing a cable through said slot;
- an attachment means having a lower portion fastened to said housing, for fastening to a support strand;
- a terminal compartment attached to one side of said housing and being comprised of a rectangular, box-like compartment having a terminal block mounted therewithin;
- a hinge integrally formed horizontally on the top side of said compartment;
- a rectangular lid pivotally mounted on said hinge, for providing access to said terminal block; and
- a sealed aperture in said housing and said terminal compartment through which a terminating stub of said terminal block protrudes.

* * * * *